United States Patent [19]
Watanabe et al.

[11] Patent Number: 5,894,526
[45] Date of Patent: Apr. 13, 1999

[54] METHOD AND DEVICE FOR DETECTING MOTION VECTORS

[75] Inventors: Hideaki Watanabe; Takashi Itoh, both of Kawasaki, Japan

[73] Assignee: Fujitsu Limited, Kawasaki, Japan

[21] Appl. No.: 08/716,877

[22] Filed: Sep. 20, 1996

[30] Foreign Application Priority Data

Apr. 26, 1996 [JP] Japan .................................. 8-106577

[51] Int. Cl.⁶ .................................................. G06K 9/36
[52] U.S. Cl. ........................................................ 382/236
[58] Field of Search ................................. 382/232, 233, 382/236; 348/398, 399, 400, 401, 402, 409, 411, 412, 413, 415, 416

[56] References Cited

U.S. PATENT DOCUMENTS

| | | | |
|---|---|---|---|
| 5,089,887 | 2/1992 | Robert et al. ............................. | 348/402 |
| 5,428,403 | 6/1995 | Andrew et al. ........................... | 348/402 |
| 5,453,801 | 9/1995 | Kim ........................................... | 348/416 |
| 5,467,136 | 11/1995 | Odaka et al. ............................. | 348/416 |
| 5,486,862 | 1/1996 | Yagasaki .................................. | 348/399 |
| 5,543,846 | 8/1996 | Yagasaki .................................. | 348/415 |
| 5,565,920 | 10/1996 | Lee et al. .................................. | 348/398 |
| 5,614,954 | 3/1997 | Jung ......................................... | 348/413 |
| 5,650,829 | 7/1997 | Sugimoto et al. ....................... | 348/402 |

FOREIGN PATENT DOCUMENTS

95/20863  8/1995  WIPO .

OTHER PUBLICATIONS

*Patent Abstracts Of Japan*, vol. 18, No. 470 (E–1600), Aug. 31, 1994 & JP 06 153146 A (Matsushita Electric Ind. Co. LTD) May 31, 1994.

*Patent Abstracts Of Japan*, vol. 96, No. 6, Jun. 28, 1996 & JP 08 046969 A (Matsushita Electric Ind. Co. LTD), Feb. 16, 1996.

*Primary Examiner*—Jose L. Couso
*Attorney, Agent, or Firm*—Staas & Halsey

[57] ABSTRACT

A method of detecting motion vectors within a predetermined search range for motion-compensation predictive coding is disclosed. The method includes the steps of searching for first motion vectors between two frames which are separated from each other in a time dimension by a first frame distance, selecting a second frame distance of two frames between which picture motion is represented by second motion vectors, making a check whether the predetermined search range covers a predetermined percentage of the second motion vectors, the check using the first motion vectors as estimates of the second motion vectors after compensation for a difference between the first frame distance and the second frame distance, and deciding, based on results of the check, whether to increase a frame distance for prediction.

20 Claims, 12 Drawing Sheets

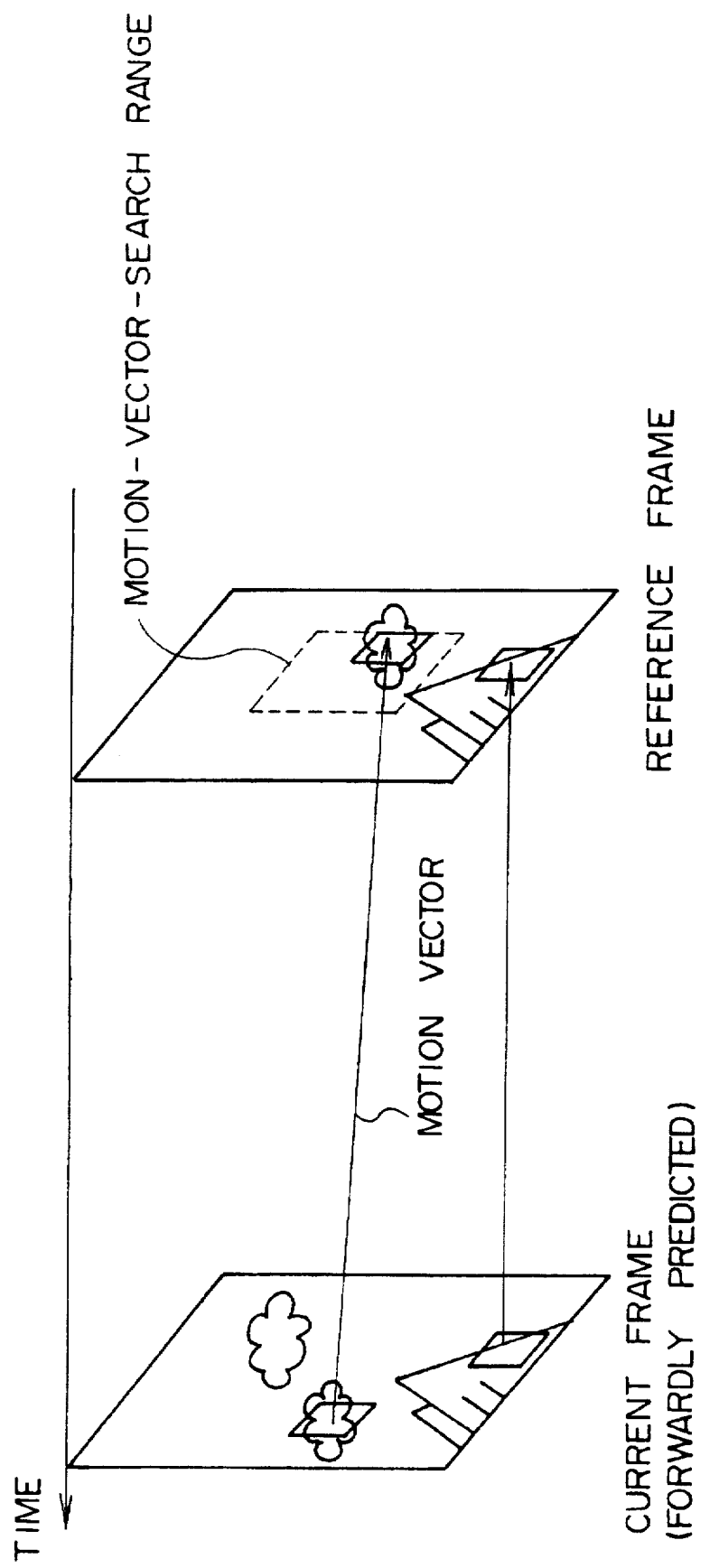

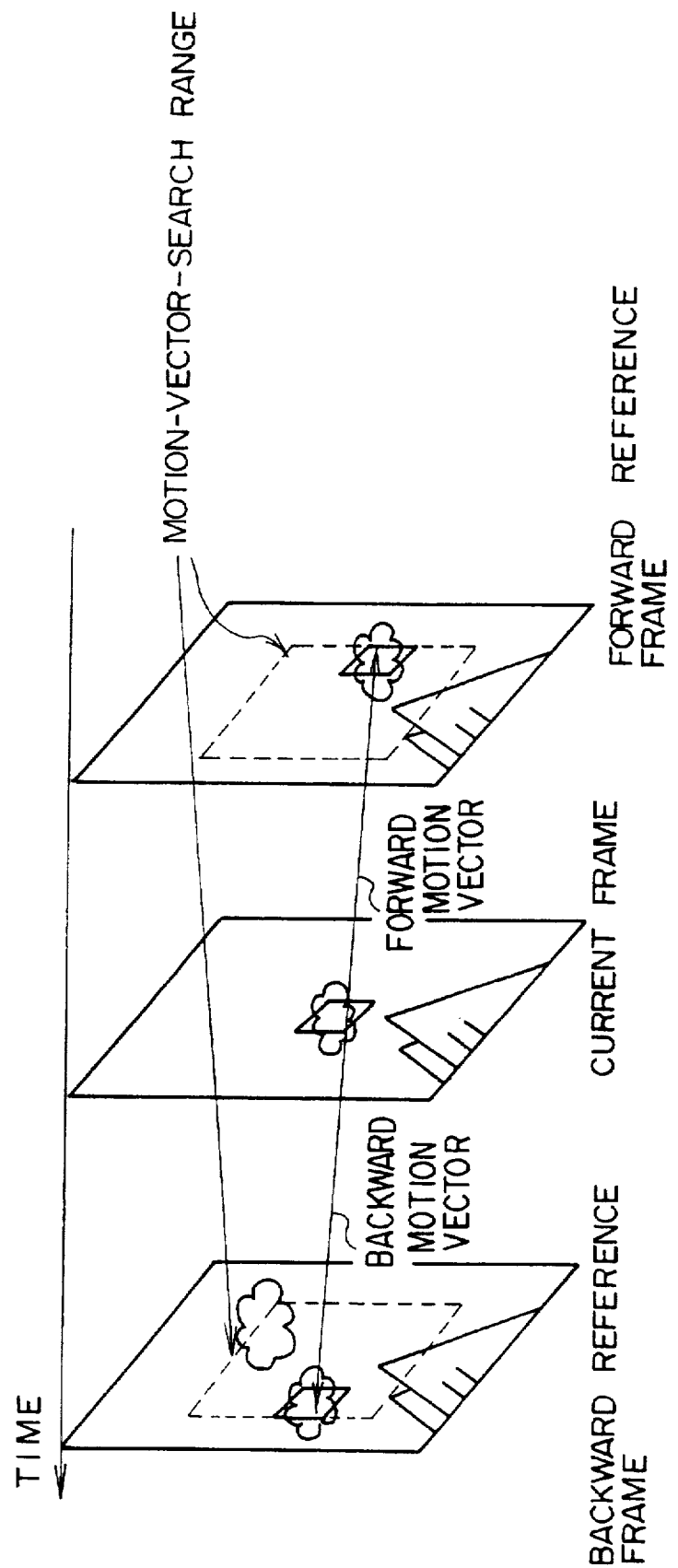

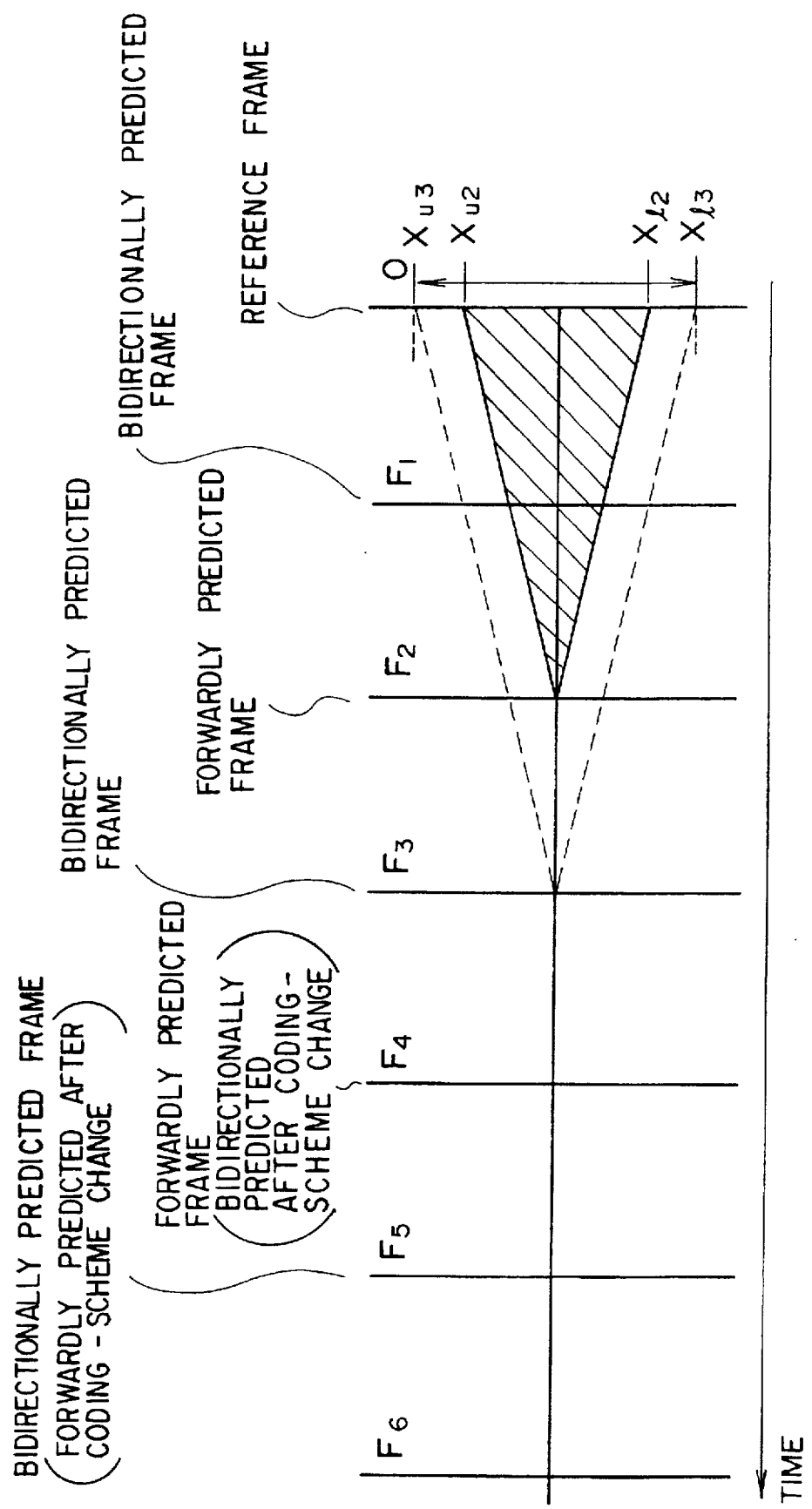

RELATIVE POSITION OF FORWARDLY PREDICTED FRAME AFTER CODING-SCHEME CHANGE

FIG. 9A

| M=1 | | | | | M=2 | | | | | M=1 | | | | |
|---|---|---|---|---|---|---|---|---|---|---|---|---|---|---|
| I0 | P1 | P2 | P3 | P4 | P5 | B6 | P7 | B8 | P9 | B10 | P11 | P12 | P13 | P14 | P15 |
| I0 | P1 | P2 | P3 | P4 | P5 | × | P7 | B6 | P9 | B8 | P11 | B10 | P13 | P12 | P15 | P14 |

FIG. 9B

| M=1 | | | | | M=2 | | | | | M=3 | | | | |
|---|---|---|---|---|---|---|---|---|---|---|---|---|---|---|
| I0 | P1 | P2 | P3 | P4 | P5 | B6 | P7 | B8 | P9 | B10 | P11 | B12 | B13 | P14 | B15 | B16 | P17 |
| I0 | P1 | P2 | P3 | P4 | P5 | × | P7 | B6 | P9 | B8 | P11 | B10 | × | P14 | B12 | B13 |

FIG. 9C

| M=2 | | | | | M=3 | | | | |
|---|---|---|---|---|---|---|---|---|---|
| B0 | I1 | B2 | P3 | B4 | P5 | B6 | B7 | P8 | B9 | B10 | P11 |
| I1 | B0 | P3 | B2 | P5 | B4 | × | P8 | B6 | B7 |

5,894,526

1

METHOD AND DEVICE FOR DETECTING MOTION VECTORS

BACKGROUND OF THE INVENTION

1. Field of the Invention

The present invention generally relates to motion-vector search methods, and particularly relates to a motion-vector search method used for inter-frame predictive coding of image information.

Image-information-compression coding schemes include internationally-standardized H.261 and H.262, MPEG1 (moving picture experts group 1) and MPEG2 (moving picture experts group 2) among others. These compression coding schemes employ various compression processes such as DCT (discrete cosine transform) motion-compensation inter-frame prediction, etc. Effective enhancement of these compression processes is expected to bring about an improvement in overall compression rates of these schemes.

2. Description of the Related Art

Image-information-compression coding schemes include inter-frame predictive coding which draws on redundancy in a time dimension to achieve compression. In using this inter-frame predictive coding MPEG1 and MPEG2 can handle both a forward prediction and a backward prediction. The forward prediction detects changes between a previous frame and a current frame, and generates the current frame based on the previous frame.

FIG. 1A is an illustrative drawing for explaining the forward prediction.

As shown in FIG. 1A, picture movement between a current frame, which is to be forwardly predicted, and a reference frame (previous frame) is detected within a predetermined range defined for motion-vector search. Then, parts of the picture showing no movement are provided with zero motion vectors, and parts of the picture showing some movement are provided with corresponding motion vectors. These motion vectors are used for coding.

FIG. 1B is an illustrative drawing for explaining the motion-vector search. As shown in FIG. 1B, a given frame is divided into a plurality of blocks $B_1, B_2, \ldots$. Each of these blocks is separately subjected to subsequent DCT and quantization processes. In a motion-vector-search process, a given block $B_N$ of a forwardly-predicted frame is searched for in the reference frame within the motion-vector-search range. Namely, a block $B'_N$ having the highest correlation with the block $B_N$ is detected within the motion-vector-search range of the reference frame. As shown in FIG. 1B, movement of the block $B_N$ is then represented by a motion vector $M_N$. At subsequent stages, a differential between the block $B_N$ and the block $B'_N$ is obtained by aligning these two blocks, and is subjected to the DCT and quantization processes. Results thus obtained and the motion vector $M_N$ are transmitted, stored, etc., as a part of coded pictures. The same processes are applied to all the blocks shown in FIG. 1B In the forward prediction of FIG. 1A, the larger the motion-vector-search range, the longer the detectable motion displacement, thereby providing higher compression rates. However, a larger motion-vector-search range requires a longer processing time.

A bidirectional prediction generates the current frame based on a previous frame (past frame) and a subsequent frame (future frame). FIG. 2 is an illustrative drawing for explaining the bidirectional prediction. As shown in FIG. 2, the current frame is coded by using a backward motion vector and a forward motion vector which are obtained based on a backward reference frame and a forward reference frame. Assuming the same motion-vector-search-range size, the directional prediction has a higher prediction efficiency than does the forward prediction. Since the directional prediction suffers from twice the processing load, however, it is a general practice to reduce the size of the motion-vector-search range by half for the directional prediction.

Pictures coded based on the forward prediction are called P-pictures (predictive pictures), and pictures coded based on the directional prediction are called B-pictures bidirectionally predictive pictures). Also, pictures coded by intra-frame coding are called I-pictures (intra pictures). MPEG1 and MPEG2 employ a coding scheme which combines the intra-frame coding, the forwardly-predictive coding, and the directionally-predictive coding together, so that a picture sequence can be represented as IBBPBBPBB . . . IBBPBBPBBP . . . , for example.

In the inter-frame predictive coding of the related art, a fixed inter-frame distance is used for motion-vector search. (The inter-frame distance refers to a time distance between frames.) When an inter-frame distance is short for the forward prediction and the motion-vector-search range is relatively large, for example, some motion-vector-search process is likely to be wasted by searching in excess of a maximum range of actually existing picture motions. Also, the inter-frame predictive coding of the related art uses a fixed number of bidirectionally-predictive-coded frames. An increase in the number of these frames may result in a situation where the motion-vector-search range for the forward prediction is not sufficiently large. In this case, the prediction efficiency is decreased.

Accordingly, there is a need for a motion-vector-search method which enhances prediction efficiency by optimizing an inter-frame distance for the motion-vector search in accordance with picture characteristics.

SUMMARY OF THE INVENTION

Accordingly, it is a general object of the present invention to provide a motion-vector-search method which can satisfy the need described above.

It is another and more specific object of the present invention to provide a motion-vector-search method which enhances prediction efficiency by optimizing an inter-frame distance for the motion-vector search in accordance with picture characteristics.

In order to achieve the above objects according to the present invention, a method of detecting motion vectors within a predetermined search range for motion-compensation predictive coding is disclosed. The method includes the steps of searching for first motion vectors between two frames which are separated from each other in a time dimension by a first frame distance, selecting a second frame distance of two frames between which picture motion is represented by second motion vectors, making a check whether the predetermined search range covers a predetermined percentage of the second motion vectors, the check using the first motion vectors as estimates of the second motion vectors after compensation for a difference between the first frame distance and the second frame distance, and deciding, based on results of the check, whether to increase a frame distance for prediction.

In the method described above, whether a sufficient motion-vector-search range can be maintained under an increased frame distance (second frame distance) is decided based on the motion vectors obtained under a current frame distance (first frame distance). Based on this decision, the frame distance is subjected to an increase to have a larger number of bidirectionally predictive pictures, thereby enhancing the prediction efficiency. Therefore, this method achieves an inter-frame predictive coding which optimizes an inter-frame distance for the motion-vector search in accordance with picture characteristics.

Other objects, and further features of the present invention will be apparent from the following detailed description when read in conjunction with the accompanying drawings.

BRIEF DESCRIPTION OF THE DRAWINGS

FIG. 1A is an illustrative drawing for explaining a forward prediction;

FIG. 2 is an illustrative drawing for explaining a bidirectional prediction;

FIG. 3 is an illustrative drawing for explaining a principle of the present invention;

FIGS. 9A through 9F are table charts for explaining the reason why the inter-frame distance should start from a possible maximum distance.

DESCRIPTION OF THE PREFERRED EMBODIMENTS

Figure 1B:
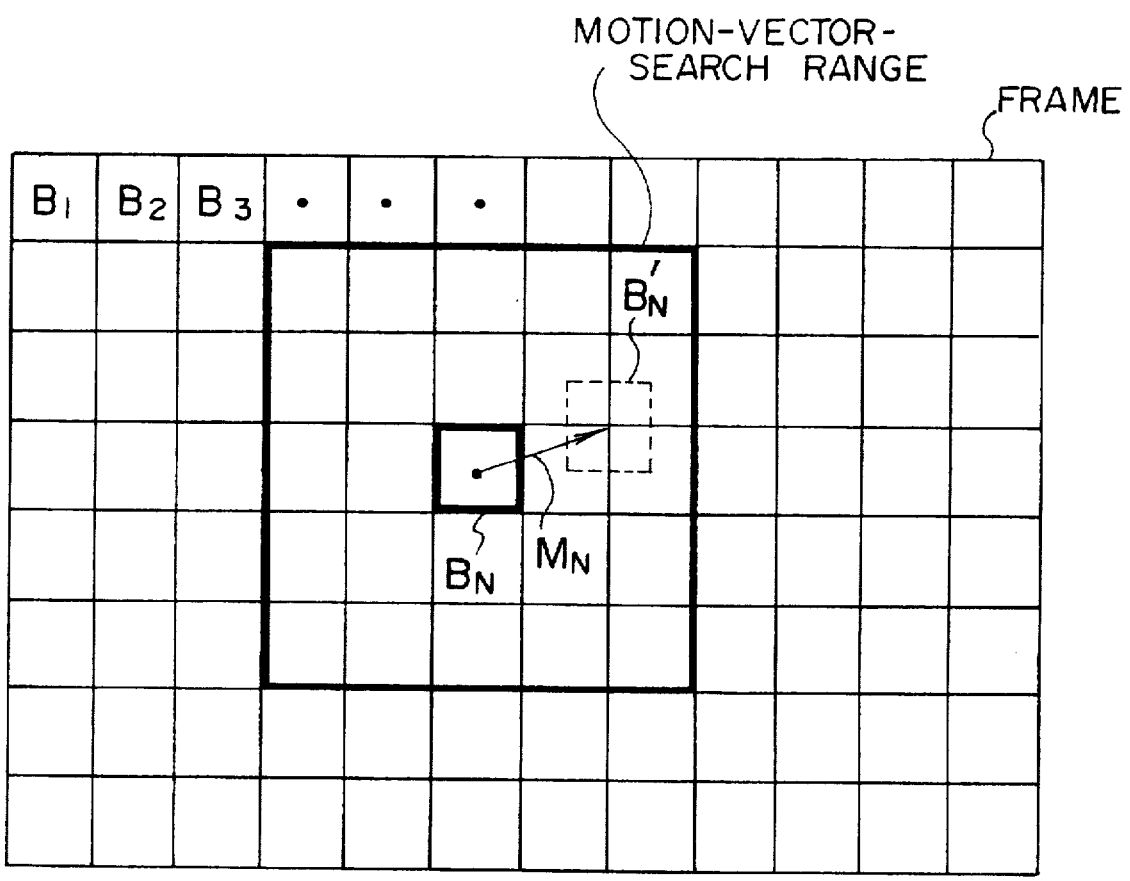
FIG. 1B is an illustrative drawing for explaining a motion-vector search.

In the following, a principle and embodiments of the present invention will be described with reference to the accompanying drawings.

FIG. 3 is an illustrative drawing for explaining the principle of the present invention. In FIG. 3, frames O and $F_1$–$F_6$ are temporary successive frames. When the frame $F_2$ is to be forwardly predicted based on the current reference frame O, the frame $F_1$ is a frame to be bidirectionally predicted based on the frames O and $F_2$. When time comes for a motion-vector search of the frame $F_2$ to be started the frame $F_4$ is then the frame to be forwardly predicted using the frame $F_2$ as a reference frame. At this time, the frame $F_3$ is bidirectionally predicted using the frames $F_2$ and $F_4$ as reference frames. Likewise, the frame $F_6$ will be a frame to be forwardly predicted using the frame $F_4$ as a reference frame, and the frame $F_5$ will be bidirectionally predicted based on the frames $F_4$ and $F_6$.

Assume that a change in a coding scheme is made such that the frame $F_5$ currently scheduled for the bidirectional prediction will be forwardly predicted based on the frame $F_2$ after this change. Also, assume that this change must be made without a decline in the prediction efficiency. When such a change is possible, the frame $F_4$ becomes a frame to be bidirectionally predicted based on the frames $F_2$ and $F_5$.

Moving pictures tend to have little change in motion characteristics between frames within a short time range. This tendency provides a reasonable assumption that motion-vector characteristics detected between the frames $F_5$ and $F_2$ are similar to those detected between the frames $F_3$ and O. Thus, an evaluation as to whether a sufficient range is provided for motion-vector search between the frames $F_5$ and $F_2$ can be made by looking into the frames $F_3$ and O.

In FIG. 3 $x_{u3}$ and $x_{13}$ are boundaries to define a motion-vector-search range used when the frame $F_3$ is forwardly predicted based on the frame O. Although a motion-vector-search range is actually a two-dimensional range-spreading in horizontal and vertical directions only one dimension, either horizontal or vertical, is used in explanation for the sake of simplicity. That is, $x_{u3}$ and $x_{13}$ denote either horizontal boundaries or vertical boundaries. Then, a horizontal or vertical component $x$ of a motion vector, detected between the frame $F_3$ and the frame O, should satisfy $x_{u3} < x < x_{13}$ in order to make an appropriate forward prediction for the frame $F_3$ based on the frame O.

In FIG. 3, $x_{u2}$ and $x_{12}$ define a range within which motion vectors detected between the frame $F_2$ and the frame O are contained. This range is used for checking whether the boundaries $x_{u3}$ and $x_{13}$ are appropriate for forward prediction of the frame $F_3$.

Based on an assumption that motions in pictures do not have abrupt speed changes in a short time period, the boundaries $x_{u3}$ and $x_{13}$ should be equivalent to the boundaries $x_{u2}$ and $x_{12}$ after compensation for a frame-distance difference. Taking into consideration the inter-frame distances, the boundaries $x_{u3}$ and $x_{13}$ and the boundaries $x_{u2}$ and $x_{12}$ should be related as:

$$x_{u2} = (2/3)(x_{u3}) \tag{1}$$

$$x_{12} = (2/3)(x_{13}) \tag{2}$$

Strictly speaking, all the motion vectors do not possibly fall into the above range. Namely, the boundaries $x_{u2}$ and $x_{12}$ shown as a hatched region in FIG. 3 include most of the motion vectors but not all of them.

When a ratio of the number of the motion vectors satisfying $x_{u2} < x' < x_{12}$ to the total number of motion vectors exceeds a predetermined threshold the boundaries $x_{u2}$ and $x_{12}$ are regarded as an appropriate range. Enlarged in proportion to the inter-frame distance, the boundaries $x_{u3}$ and $x_{13}$ shown by dashed lines in FIG. 3 include the motion vectors by approximately the same ratio. Since the motion-vector-search range defined by the boundaries $x_{u3}$ and $x_{13}$ can be regarded as appropriate, it is fair to assume that the same motion-vector-search range is sufficient for motion-vector search between the frames $F_5$ and $F_2$.

In this manner, when the above-mentioned ratio exceeds a certain threshold, the frame $F_5$ can be forwardly predicted by using the frame $F_2$ as a reference frame.

There are cases in which the above ratio does not exceed the predetermined threshold. It is possible that, even under this condition, the motion-vector-search range is still appropriate to maintain the current coding scheme. On the other hand, when the current motion-vector-search range is insufficient even for the current coding scheme, a larger motion-vector-search range would have to be arranged in order to avoid a decline in prediction efficiency. Distinction between these two cases can be made by pixel-to-pixel differentials between original pictures and predicted pictures created based on motion vectors.

When the motion-vector-search range is ascertained to be insufficient, an inter-frame distance for the forward prediction is shortened to have a forward prediction between the frames $F_3$ and $F_2$, thereby regaining a sufficient motion-vector-search range. When the motion-vector-search range is ascertained to be sufficient but not enough to satisfy the required condition between the above ratio and the predetermined threshold, a forward prediction is made between the frames $F_4$ and $F_2$ as originally scheduled.

In this manner, at the time when a motion-vector search for the frame O is finished, a decision can be made whether to have a next forward prediction between the frames $F_5$ and $F_2$, between the frames $F_4$ and $F_2$, or between the frames $F_3$ and $F_2$. When a scene change occurs in pictures, however, this decision which is made as described above, becomes invalid. To cope with this situation, a reliability measure of the evaluation made on the motion-vector-search range between the frames $F_2$ and O is obtained. Namely, pixel-to-pixel differentials between the frames $F_2$ and O are obtained, and are added for all pixels to provide an accumulated differential. When this accumulated differential exceeds a predetermined amount, no change is made to the inter-frame distance.

Figure 4:
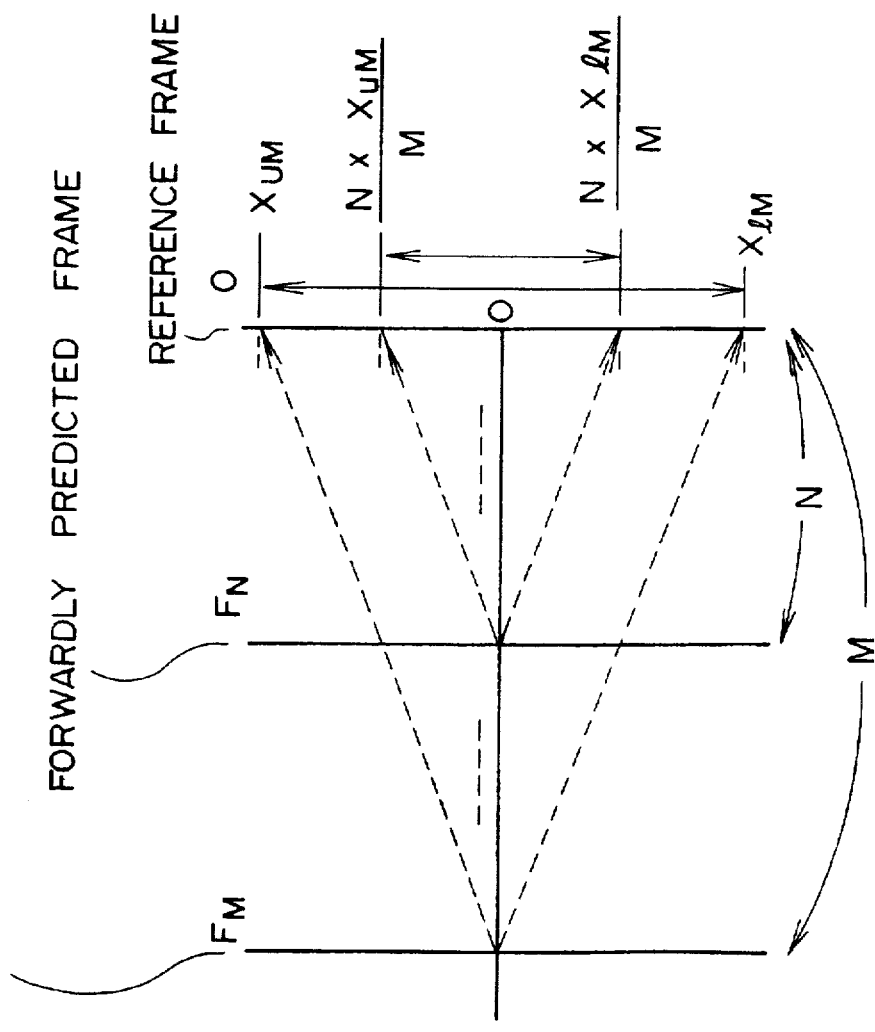
FIG. 4 is an illustrative drawing showing a forward prediction according to the present invention.

FIG. 4 is an illustrative drawing showing a forward prediction according to the present invention. In FIG. 4, the forward prediction is generalized by using integers N and M. A frame $F_N$ is a N-th frame when frames are successively counted from the frame O, and, likewise, a frame $F_M$ is a M-th frame. Currently, a forward prediction is made for the frame $F_N$ by using the frame O as a reference frame. Then, a check is made whether the motion-vector-search range is sufficient for the frame $F_M$ to use the frame O as a reference frame. This check is made based on results which are obtained from the motion-vector search at the frame $F_N$.

Under an assumption that no abrupt change is present in picture motion, a forward prediction for the frame $F_M$ requires a motion-vector component x detected between the frame $F_N$ and the frame O to satisfy:

$$[(N \cdot x_{lM})/M] < x < [(N \cdot x_{uM})/M] \qquad (3)$$

where $x_{lM}$ and $x_{uM}$ are boundaries to define the motion-vector-search range used between the frame $F_M$ and the frame O.

Namely, assuming no abrupt change in picture motion, a forward prediction of the frame $F_M$ based on the reference frame O can be made, if motion vectors detected between the frame $F_N$ and the frame O satisfies the inequality (3) in a sufficient number so that a ratio of such motion vectors to all the motion vectors exceeds a predetermined threshold. In this manner an enhancement of the prediction efficiency can be achieved.

Figure 5:
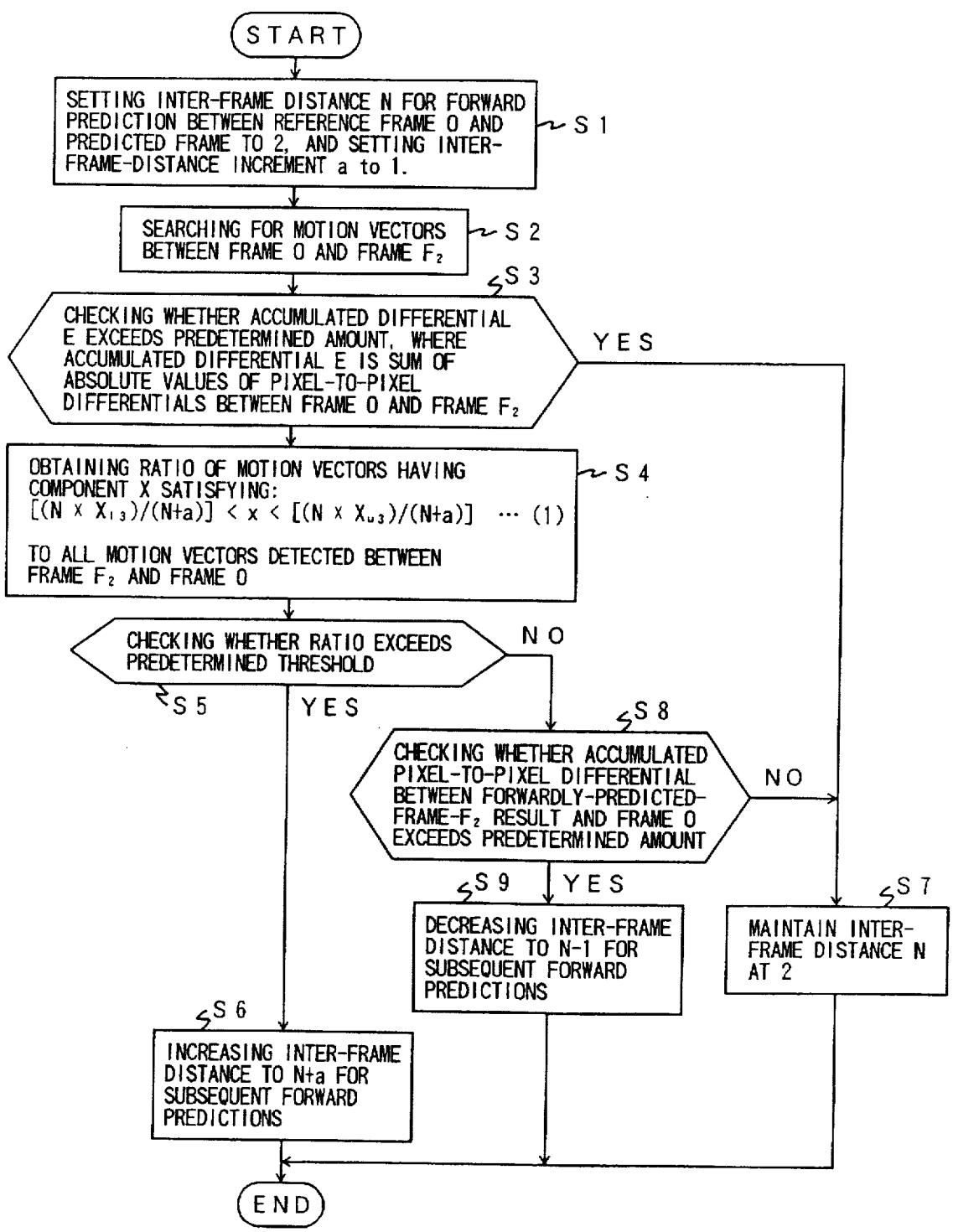
FIG. 5 is a flowchart of a process of changing an inter-frame distance according to an embodiment of the present invention.

FIG. 5 is a flowchart of a process of changing the inter-frame distance according to an embodiment of the present invention.

At a step S1, an inter-frame distance N for the forward prediction between the reference frame O and a predicted frame is set to 2, and an inter-frame-distance increment a is set to 1.

At a step S2, motion vectors are searched for between the frame O and the frame $F_2$.

At a step S3, a check is made whether an accumulated differential E exceeds a predetermined amount. Here, the accumulated differential E is a sum of absolute values of pixel-to-pixel differentials between the frame O and the frame $F_2$. If the accumulated differential E exceeds the predetermined amount, the procedure goes to a step S7. Otherwise, the procedure goes to a step S4.

At the step S7, the inter-frame distance N is maintained at 2. This is the case where a scene change is present.

At the step S4 when the accumulated differential E is below the predetermined range, a ratio of the motion vectors having a component x satisfying:

$$[(N \cdot x_{l3})/(N+a)] < x < [(N \cdot x_{u3})/(N+a)] \qquad (4)$$

to all the motion vectors detected between the frame $F_2$ and the frame O is obtained.

At a step S5, a check is made whether the ratio exceeds a predetermined threshold. If it does, the procedure goes to a step S6. Otherwise, the procedure goes to a step S8.

At the step S6, the inter-frame distance is increased to N+a for subsequent forward predictions. (The inter-frame distance is increased to 3 according to the conditions set at the step S1.)

At the step S8 when the ratio is below the predetermined thresholds a check is made whether an accumulated pixel-to-pixel differential between a forwardly-predicted-frame-$F_2$ result and the frame O exceeds a predetermined amount. If it does not, the procedure goes to the step S7 to maintain the inter-frame distance N at 2. If the accumulated differential exceeds a predetermined amount, the procedure goes to a step S9.

At the step S9, the inter-frame distance is decreased to N−1 for subsequent forward predictions. (The inter-frame distance is decreased to 1 according to the conditions set at the step S1.)

In this manner, whether a sufficient motion-vector-search range can be maintained under an increased inter-frame distance is decided based on the motion vectors obtained from the forward prediction. Based on this decisions the inter-frame distance is subjected to an increase or a decrease to achieve a inter-frame predictive coding responsive to picture-information characteristics.

Figure 6:
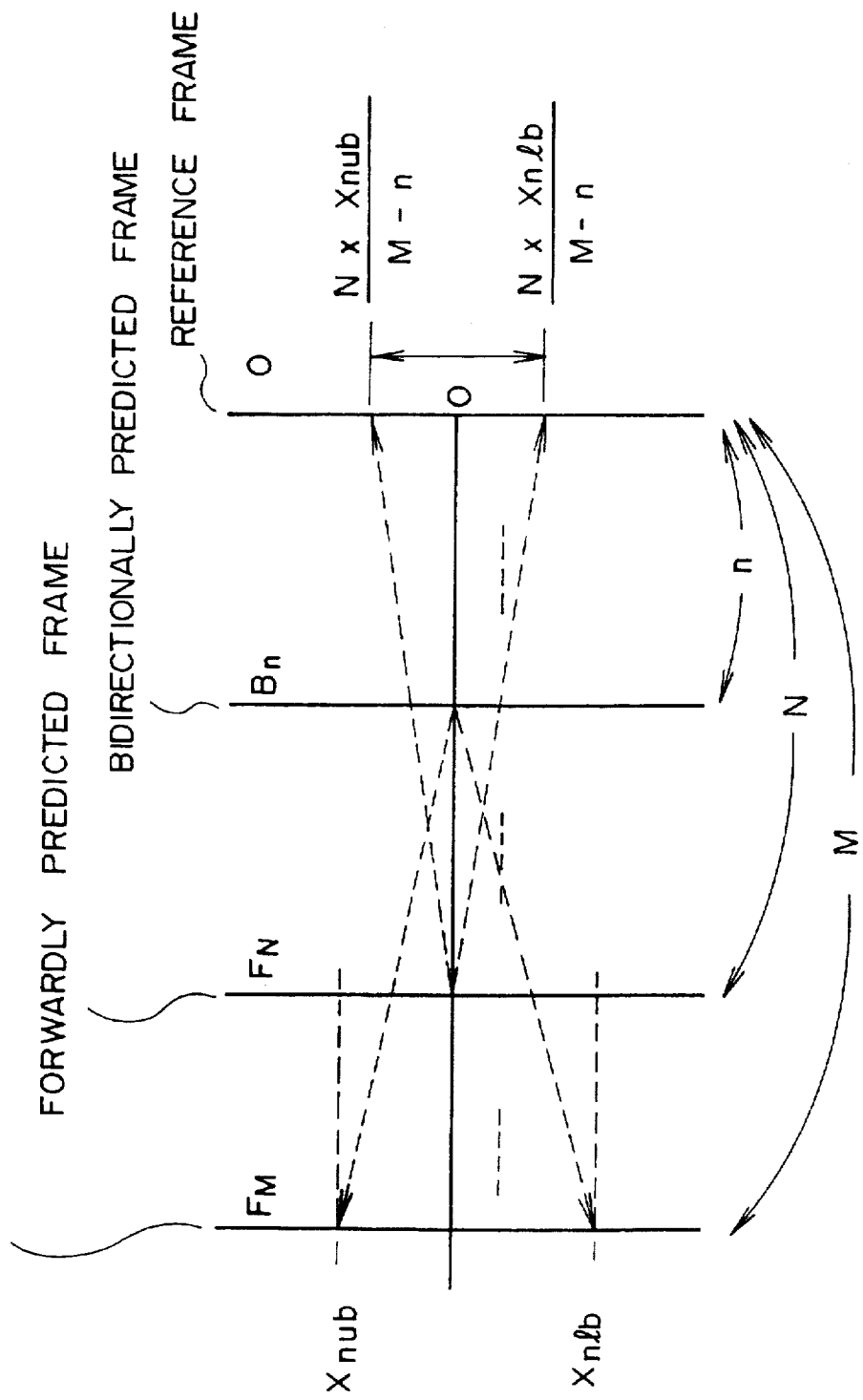
FIG. 6 is an illustrative drawing for explaining a check on a motion-vector-search range of a bidirectional prediction according to the present invention.

FIG. 6 is an illustrative drawing for explaining a check on a motion-vector-search range of a bidirectional prediction according to the present invention. The same as in FIG. 4, a forward prediction is currently made for the frame $F_N$ by using the reference frame O, which is provided N-frames before in a time dimension. Also, a backward prediction of the frame $B_n$ for the bidirectional prediction is made based on the frame $F_N$. Based on motion-vector-search results for the frame $F_N$, a check is made whether a sufficient backward motion-vector-search range is maintained for the bidirectional prediction of the frame $B_n$ even when the forward-prediction is made for the frame $F_M$.

Under an assumption that no abrupt change is present in picture motion, a backward prediction of the frame $B_n$ based on the frame $F_M$ requires a motion-vector component x detected between the frame $F_N$ and the frame O to satisfy:

$$[(N \cdot x_{nlb})/(M-n)] < x < [(N \cdot x_{nub})/(M-n)] \qquad (5)$$

where $x_{nlb}$ and $x_{nub}$ are boundaries to define the backward motion-vector-search range used between the frame $B_n$ and the frame $F_M$. Here, N in the inequality (5) is the inter-frame distance between the frame $F_N$ and the frame O, and (M−n) is the inter-frame distance between the frame $F_M$ and the frame $B_n$. That is, the range defined by the inequality (5) is equivalent to the backward motion-vector-search range defined by the boundaries $x_{nlb}$ and $x_{nub}$ after compensation for a difference of these inter-frame distances.

Under an assumption of no abrupt motion change, a sufficient backward motion-vector-search range can be maintained even when the backward reference frame is changed from the frame $F_N$ to the frame $F_M$, i.e., even when a frame forwardly predicted based on the reference frame O is changed from the frame $F_N$ to the frame $F_M$. This sufficient backward motion-vector-search range can be maintained for any frames appearing immediately after the reference frame O which satisfies the inequality (5) together with the frame $F_N$. In actuality, a requirement is that a ratio of motion vectors satisfying the inequality (5) to all the motion vectors detected between the frame $F_N$ and the reference frame O exceed a predetermined threshold. As long as this requirement is met, the frame $B_n$ can be backwardly predicted based on the frame $F_M$.

Accordingly, a check as to whether the inter-frame distance can be increased may involve two decision making processes. First, a check may be made whether the vector-search range is sufficient for a forward prediction under an increased inter-frame distance. Then, another check may be made whether the vector-search range is sufficient for a backward prediction under the increased inter-frame distance. In the flowchart of FIG. 5, for example, both of these two checks may be made at the step S4.

In this manner, whether a sufficient motion-vector-search range for bidirectional prediction can be maintained under an increased inter-frame distance is decided based on the motion vectors obtained from the forward prediction Based on this decision the inter-frame distance for the forward prediction is subjected to an increase or a decrease, and, in response, the number of bidirectionally predicted frames is increased or decreased.

Figure 7:
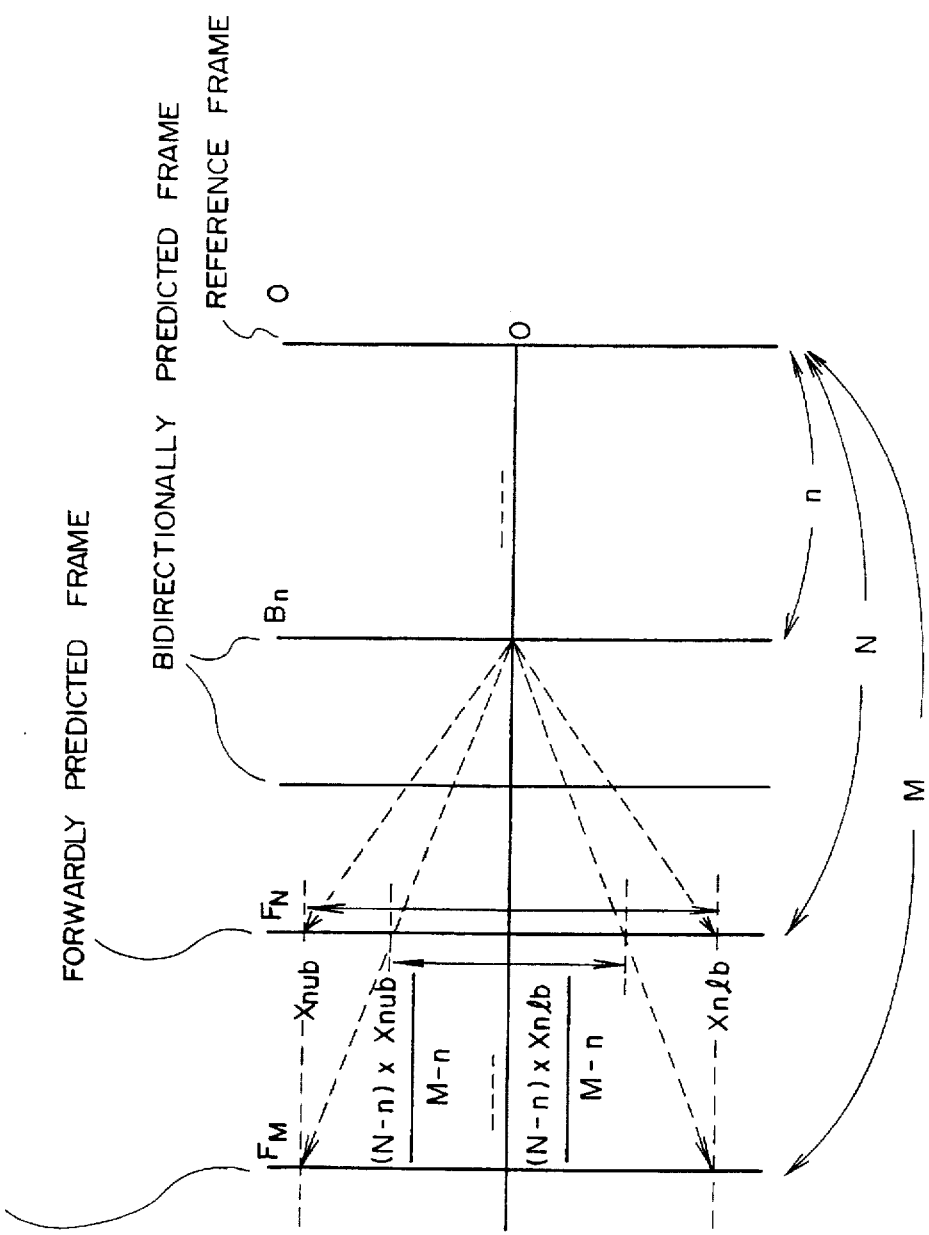
FIG. 7 is an illustrative drawing for explaining another check on a motion-vector-search range of the bidirectional prediction according to the present invention.

FIG. 7 is an illustrative drawing for explaining another check on a motion-vector-search range of the bidirectional prediction according to the present invention. A check shown in FIG. 7 is used in the same manner as the check of FIG. 6, and provides another method of deciding whether the motion-vector-search range is sufficient for a bidirectional prediction under an increased inter-frame distance.

The same as in FIG. 4 and FIG. 6, a forward prediction is currently made for the frame $F_N$ by using the reference frame O, which is provided N-frames before in a time dimension. Also, a backward prediction of the frame $B_n$ for the bidirectional prediction is made based on the frame $F_N$. Based on backward-motion-vector-search results obtained between the frame $F_N$ and the frame $B_n$, a check is made whether a sufficient backward motion-vector-search range is maintained for the bidirectional prediction of the frame $B_n$ even when the forward-prediction is made for the frame $F_M$.

Under an assumption that no abrupt change is present in picture motion, a backward prediction of the frame $B_n$ based on the frame $F_M$ requires a motion-vector component x detected between the frame $B_n$ and the frame $F_N$ to satisfy:

$$[(N-n) \cdot x_{nlb}/(M-n)] < x < [(N-n) \cdot x_{nub}/(M-n)] \qquad (6)$$

where $x_{nlb}$ and $x_{nub}$ are boundaries to define the backward motion-vector-search range used between the frame Bn and the frame $F_M$. Here, (N−n) in the inequality (6) is the inter-frame distance between the frame $F_N$ and the frame $B_n$, and (M−n) is the inter-frame distance between the frame $F_M$ and the frame $B_n$. That is, the range defined by the inequality (6) on the frame $F_N$ is equivalent to the backward motion-vector-search range defined by the boundaries $x_{nlb}$ and $x_{nub}$ on the frame $F_M$ after compensation for a difference of the inter-frame distances.

Under an assumption of no abrupt motion change, a sufficient backward motion-vector-search range can be maintained even when the backward reference frame is changed from the frame $F_N$ to the frame $F_M$, i.e., even when a frame forwardly predicted based on the reference frame O is changed from the frame $F_N$ to the frame $F_M$. This sufficient backward motion-vector-search range can be maintained for any frames appearing immediately after motion-vector-search results satisfying the inequality (6) are obtained. In actuality, a requirement is that a ratio of motion vectors satisfying the inequality (6) to all the motion vectors detected between the frame $F_N$ and the frame $B_n$ exceed a predetermined threshold. As long as this requirement is met, the frame $B_n$ can be backwardly predicted based on the frame $F_M$.

In this manner, whether a sufficient motion-vector-search range for bidirectional prediction can be maintained under an increased inter-frame distance is decided based on the motion vectors obtained from the bidirectional prediction. Based on this decision, the inter-frame distance for the forward prediction is subjected to an increase or a decrease, and, in response, the number of bidirectionally predicted frames is increased or decreased.

Figure 8:
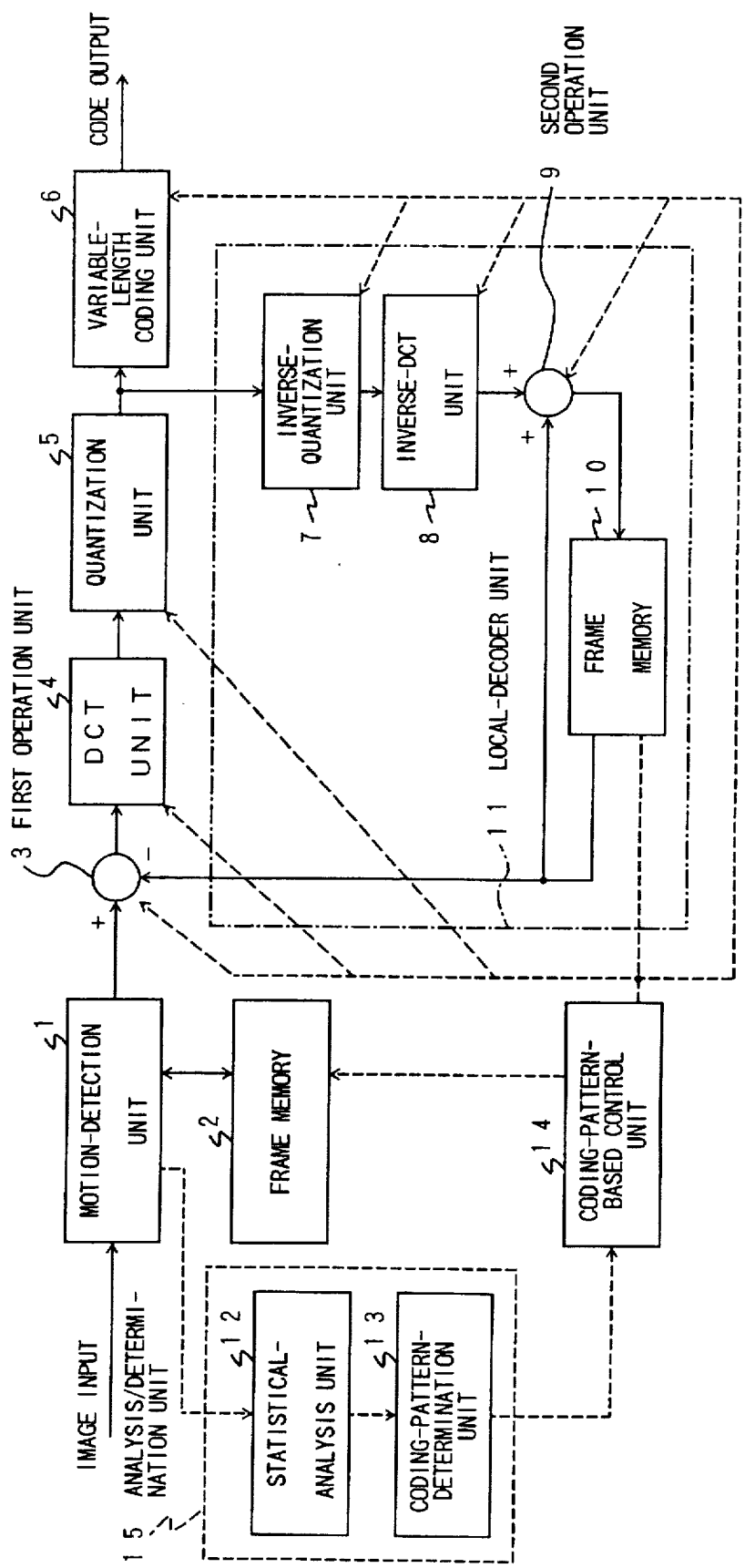
FIG. 8 is a block diagram of an embodiment of an image processing device according to the present invention.

FIG. 8 is a block diagram of an embodiment of an image processing device according to the present invention. The image processing device of FIG. 8 includes a motion-detection unit 1, a frame memory 2, a first operation unit 3, a DCT unit 4, a quantization unit 5, a variable-length coding unit 6, an inverse-quantization unit 7, an inverse-DCT unit 8, a second operation unit 9, a frame memory 10, a local-decoder unit 11, a statistical-analysis unit 12, a coding-pattern-determination unit 13, a coding-pattern-based control unit 14, and an analysis/determination unit 15.

The frame memory 2 has a multi-bank structure to cope with different inter-frame distances which are used for detection of motion vectors. The frame memory 10 of the local-decoder unit 11 has two banks for storing pictures of the forward reference and the backward reference. The first operation unit 3 and the second operation unit 9 are in a through operation mode to pass data through when the intra-frame coding is applied. When the inter-frame coding is used, the first operation unit 3 operates as a subtracter, and the second operation unit 9 operates as an adder.

Motion vectors detected by the motion-detection unit 1 are supplied to the statistical-analysis unit 12 of the coding-pattern-analysis/determination unit 15. The statistical-analysis unit 12 obtains statistics of the magnitude of the motion vectors. Based on the obtained statistics, the coding-pattern-determination unit 13 determines a coding pattern of pictures by deciding the inter-frame distances for predictions, and notifies the coding-pattern-based control unit 14 of the determined coding patterns. The coding-pattern-based control unit 14 takes care of bank management of the frame memory 2 according to the inter-frame distances of the coding pattern. Also, the coding-pattern-based control unit 14 is responsible for control of the first operation unit 3, the DCT unit 4, the quantization unit 5, the variable-length coding unit 6, the inverse-quantization unit 7, the inverse-DCT unit 8, the second operation unit 9, and the frame memory 10, according to the coding pattern.

In the case of the I picture, the first operation unit 3 and the second operation unit 9 are in a through operation mode to pass the data through. Picture information is, DCT-transformed by the DCT unit 4, is quantized by the quantization unit 5, and is coded by the variable-length coding unit 6 before being output from the image processing device. Also, the transformed and quantized picture information is inverse-quantized by the inverse-quantization unit 7, and is inverse-DCT-transformed by the inverse-DCT unit 8 before being stored in the frame memory 10.

In the case of the P picture, the motion-detection unit 1 reads from the frame memory 2 a previous frame in accordance with the inter-frame distance of the forward prediction, and compares this previous frame with the current frame to obtain motion vectors within a motion-vectorsearch range. The first operation unit 3 is controlled to work as a subtracter, and the second operation unit 9 is controlled to serve as an adder. The first operation unit 3 receives each block of the current frame from the motion-detection unit 1, and receives each corresponding block of the previous frame from the frame memory 10 in accordance with the detected motion vectors. Then, the first operation unit 3 takes block-to-block differentials between the current frame and the previous frame. The block-to-block differentials are coded by the DCT unit 4, the quantization unit 5, and the variable-length coding unit 6 to achieve inter-frame coding of the current frame. The second operation unit 9 obtains a sum between these differentials and the previous frame to obtain a predicted current frame, which is stored in the frame memory 10.

In the case of the B picture, the coding-pattern-based control unit 14 determines the number of B pictures inserted between a P picture and one of an I picture and a P picture. As previously described, the B picture is predicted by using the forwardly-predicted P picture and the reference picture, which is one of an I picture and a previous P picture. In order to achieve this, pictures are generally provided in a partially reversed order at the time of coding. When a picture sequence is I1B2P3 (i.e., a sequence of an intra picture, a bidirectionally predictive picture, and a forwardly predictive picture), for example, an actual picture sequence for coding is I1P3B2. Namely, a first frame is coded as an I picture based on intra-frame coding, and, then, a third frame is coded as a P picture based on forward prediction. Finally, a second frame is coded based on bidirectional prediction by using the I picture and the P picture.

In MPEG, three different modes are prepared for the bidirectional prediction. A first mode is use of only the forward prediction. A second mode is use of only the backward prediction, and a third mode is use of both the backward prediction and the forward prediction. The best mode among these three mode is determined for each block, and is used for coding the respective block. In the following description, the third mode using both the backward prediction and the forward prediction will be taken as an example for the sake of simplicity of explanation.

The frame memory 2 is controlled by the coding-pattern-based control unit 14 based on the determined coding pattern, and the motion-detection unit 1 searches for motion vectors for the forward prediction and the backward prediction of the bidirectional prediction. The first operation unit 3 and the second operation unit 9 are controlled in the same manner as in the case of coding the P picture. Both banks for the forward prediction and the backward prediction are used in the frame memory 10.

The motion-detection unit 1 reads from the frame memory 2 two reference frames for the forward prediction and the backward prediction, and compares the current frame with both the forward reference frame and the backward reference frame to obtain motion vectors within a motion-vector-search range. The first operation unit 3 receives each block of the current frame from the motion-detection unit 1, and receives each corresponding block of these two reference frames from the frame memory 10 in accordance with the detected motion vectors. Then, the first operation unit 3 takes block-to-block differentials between the current frame and an average of the two reference frames. The block-to-block differentials are coded by the DCT unit 4, the quantization unit 5, and the variable-length coding unit 6 to achieve bidirectionally predictive coding of the current frame.

The present invention is not limited to the above described embodiment, but other variations and modifications can be made. For example, inter-frame differences between the reference frame and a frame to be predicted (forward prediction or bidirectional prediction) may be obtained to check the existence of a scene change. Namely, an absolute-value sum of the inter-frame differences between the reference frame and the frame to be predicted is obtained and compared with a predetermined value. This may be done by the motion-detection unit 1 and the statistical-analysis unit 12, for example. When this sum exceeds the predetermined value, the coding-pattern-based control unit 14 controls the other elements so as not to change the inter-frame distances.

Further, an absolute-value sum of differences between an original frame and a prediction-resulted frame (forward prediction or bidirectional prediction) may be obtained and compared with a predetermined value. This may be done by the coding-pattern-based control unit 14. When this sum exceeds the predetermined value, the coding-pattern-based control unit 14 controls the other elements to shorten the inter-frame distance between a reference frame and a frame to be predicted. In this manner, the inter-frame distance is reduced to regain an appropriate motion-vector-search range.

Preferably, the inter-frame distance is set at the possible maximum distance of the device at the start of the moving-picture coding of the present invention. For examples when a forward-prediction inter-frame distance M is 3 at a maximum according to the capacity of the device the forward-prediction inter-frame distance M should start from 3 in the moving-picture coding.

FIGS. 9A through 9F are table charts for explaining the reason why the inter-frame distance should start from the possible maximum distance. In FIGS. 9A through 9F, the forward-prediction inter-frame distance M is changed once in every 6 frames. In each table chart of FIGS. 9A through 9F the top row shows the forward-prediction inter-frame distance M, the middle row shows a sequence of I, P, and B pictures of the input picture information, and the bottom row shows a coded-picture sequence of I, P, and B pictures. A numeral after the symbol I, P, or B denote the frame number. For example, I0, P1, P2, P3, P4, P5, and B6 represent an I picture of frame number 1, P pictures of frame numbers 2–5, and a B picture of frame number 6, respectively.

FIG. 9A shows a case in which an initial inter-frame distance for the forward prediction is 1. In FIG. 9A, the forward-prediction inter-frame distance M (hereinafter, merely referred to as an inter-frame distance unless there is possibility of creating confusion) is changed from 1, 2, to 1, successively. When a picture sequence of I0, P1, P2, P3, . . . is provided as the picture information at the start of the picture coding, a coded-picture sequence I0, P1, P2, P3, . . . is obtained with a delay of one frame period because of processing time for coding.

When the initial value of the inter-frame distance M is started from 1 as shown in FIG. 9A, a coded frame is not present for a certain frame period, as shown by the symbol x. Namely, in the frame period indicated by the symbol x, P7 should be output as a coded frame ahead of B6, but is still in the process of coding. This lack of the frame occurs after the inter-frame distance M is changed from 1 to 2.

FIG. 9B shows a case in which an initial inter-frame distance for the forward prediction is 1. In FIG. 9B, the forward-prediction inter-frame distance M is changed from 1, 2 to 3, successively.

When the initial value of the inter-frame distance M is 1 as shown in FIG. 9B, a coded frame is not present for a certain frame period, as shown by the symbol x. This lack of the frame occurs after the inter-frame distance M is changed from 1 to 2 and after it is changed from 2 to 3.

FIG. 9C shows a case in which the inter-frame distance M is started at 2 and changed to 3. In this case, a coded frame is lacking during a certain frame period shown by the symbol x, and this occurs after the inter-frame distance M is changed from 2 to 3.

Figure 9D:
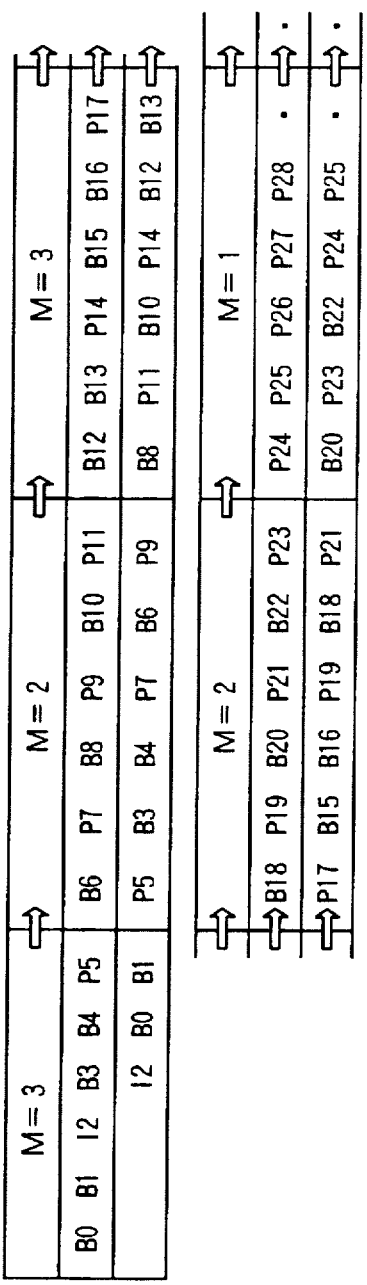
Figure 9E:
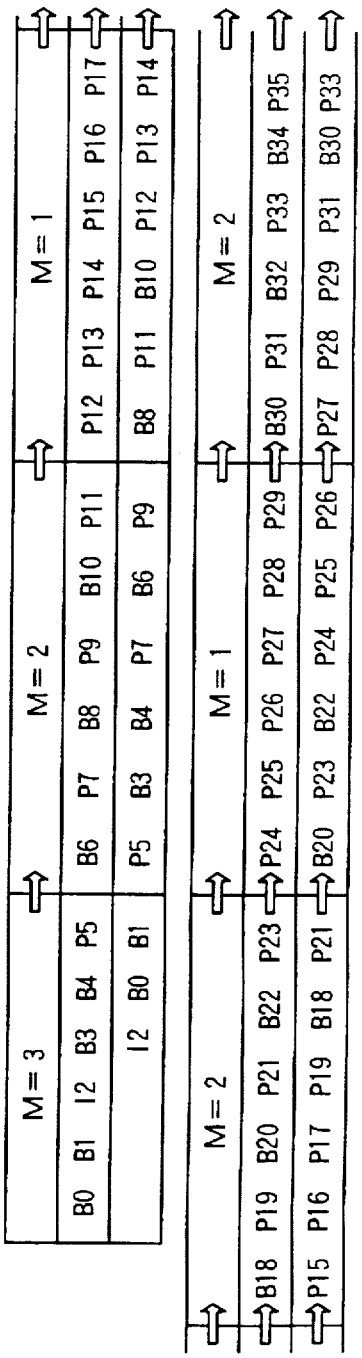
Figure 9F:
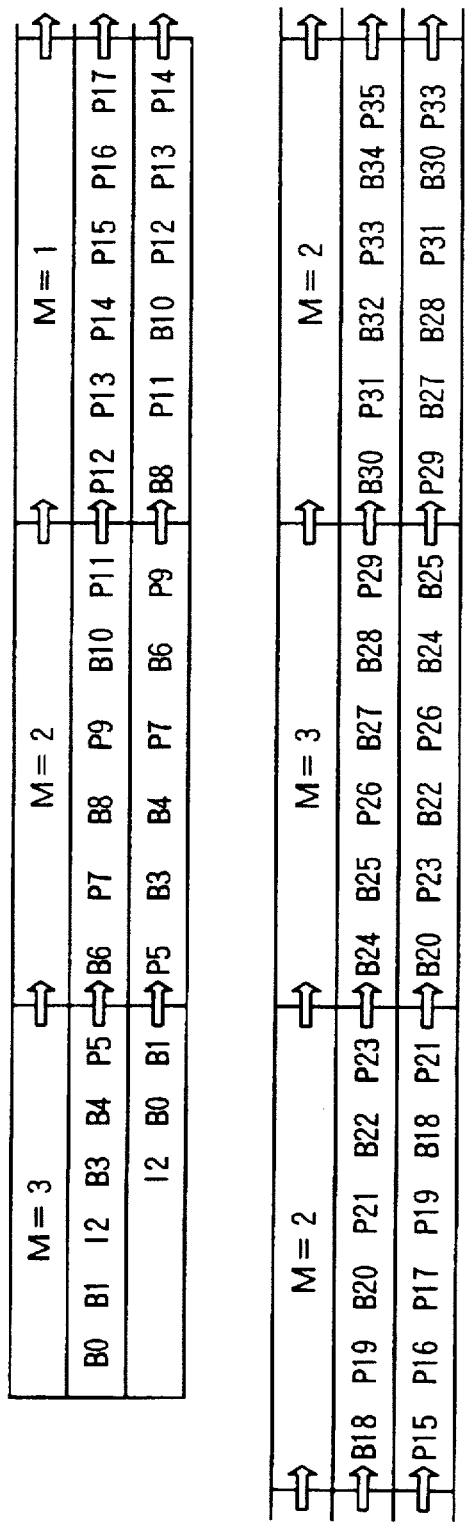

FIGS. 9D through 9F show cases in which the inter-frame distance M is initially at the maximum distance of 3. FIG. 9D shows a case in which the inter-frame distance M is changed from 3, 2, 3, 2, to 1, successively. In FIG. 9E, the inter-frame distance M is changed from 3, 2, 1, 2, 1, to 2, successively FIG. 9F shows changes of the inter-frame distance M from 3, 2, 1, 2, 3, to 2. In these figures, a picture sequence of B0, B1, I2, B3, . . . is provided as the picture information at the start of the picture coding, and a coded-picture sequence I2, B0, B1, . . . is obtained with a delay of three frame periods because I2 should be coded first ahead of B0 and B1.

In the cases of FIGS. 9D through 9F, an initial value of the inter-frame distance is set to the possible maximum value, so that the delay of the coded-picture sequence is maximized from the beginning. As a result, a change in the inter-frame distance M does not bring about a frame period lacking a coded frame. FIGS. 9D through 9F show only the cases in which the inter-frame distance M is changed by ±1. However, even when the inter-frame distance M is changed by ±2, a maximum initial value of the inter-frame distance ensures that any frame period has a coded frame.

Occurrence of such a frame period as having no coded frame does not mean that a motion-vector-search process is impaired. In the operation of the image processing device, however, discontinuity in the coded-frame sequence caused by such a frame period is undesirable in terms of the stability of the operation As described above, the use of the possible maximum value for the initial inter-frame distance ensures continuity of the coded-frame-output data stream Also, if image characteristics are known or can be estimated in advance, the inter-frame distance may be set to a distance of the highest occurrence.

As described above, according to the present invention used in a coding scheme employing a combination of the forward prediction and the bidirectional prediction, an inter-frame distance with an appropriate motion-vector-search range is determined based on detected motion vectors by drawing on an assumed image characteristic that no abrupt change is present in picture motions within a short time period. In the case of motion vectors being small, an increase in the inter-frame distance is justified since an appropriate motion-vector-search range can be maintained after the increase In this case, the inter-frame distance is streched to increase the number of bidirectionally-predicted frames which have high prediction efficiency.

Further, the present invention is not limited to these embodiments but various variations and modifications may be made without departing from the scope of the present invention.

What is claimed is:

1. A method of detecting motion vectors within a predetermined search range for a motion compensation predictive coding, said method comprising the steps of:

a) searching for first motion vectors between two frames which are separated from each other in a time dimension by a first frame distance;

b) selecting a second inter-frame distance in said time dimension of two frames between which picture motion is represented by second motion vectors;

c) making a check and receiving results of whether said predetermined search range covers a predetermined percentage of said second motion vectors, said check using said first motion vectors as estimates of said second motion vectors after compensation for a time difference between said first inter-frame distance and said second inter-frame distance; and d) increasing an inter-frame time distance for detection of said motion vectors for said motion-compensation predictive coding when warranted by the results of said check.

2. A method of detecting motion vectors within a predetermined search range for a motion compensation predictive coding, said method comprising the steps of:

a) searching for first motion vectors between two frames which are separated from each other in a time dimension by a first frame distance and obtaining said first motion vectors within said predetermined range between a reference frame and a forwardly-predicted frame in order to forwardly predict said forwardly-predicted frame;

b) selecting a second frame distance of two frames between which picture motion is represented by second motion vectors;

c) making a check whether said predetermined search range covers a predetermined percentage of said second motion vectors, said check using said first motion vectors as estimates of said second motion vectors after compensation for a difference between said first frame distance and said second frame distance; and d) deciding, based on results of said check, whether to increase a frame distance for prediction and deciding, based on said results of said check, whether to increase said frame distance for forward prediction from said first frame distance to said second frame distance.

3. The method as claimed in claim 2, wherein said step c) further comprises a step of changing a scale of either said predetermined search range or said first motion vectors in order to achieve said compensation.

4. The method as claimed in claim 3, wherein said step c) further comprises a step of changing said scale by a ratio between said first frame distance and said second frame distance.

5. The method as claimed in claim 3, wherein said step c) comprises the steps of:

c1) obtaining a percentage of said first vectors (x, y) satisfying:

$$N \cdot x_{lM}/M < x < N \cdot x_{uM}/M$$

$$N \cdot y_{lM}/M < y < N \cdot y_{uM}/M$$

wherein N is said first frame distance, M is said second frame distance, $x_{lM}$ and $x_{uM}$ are horizontal boundaries of said predetermined search range, and $y_{lM}$ and $y_{uM}$ are vertical boundaries of said predetermined search range; and c2) checking whether said percentage exceeds said predetermined percentage.

6. A method of detecting motion vectors within a predetermined search range for a motion compensation predictive coding, said method comprising the steps of:

a) searching for first motion vectors between two frames which are separated from each other in a time dimension by a first frame distance and obtaining said first motion vectors between a reference frame a forwardly-predicted frame in order to forwardly predict said forwardly-predicted frame;

b) selecting a second frame distance of two frames between which picture motion is represented by second motion vectors and selecting said second frame distance in order to backwardly predict a bidirectionally-predicted frame based on a backward-reference frame;

c) making a check whether said predetermined search range covers a predetermined percentage of said second motion vectors, said check using said first motion vectors as estimates of said second motion vectors after compensation for a difference between said first frame distance and said second frame distance; and d) deciding, based on results of said check, whether to increase a frame distance for prediction and deciding, based on said results of said check, whether to increase said frame distance for forward prediction from said first frame distance so that a frame distance for backward prediction is increased to said second frame distance.

7. The method as claimed in claim 6, wherein said step c) further comprises a step of changing a scale of either said predetermined search range or said first motion vectors in order to achieve said compensation.

8. The method as claimed in claim 7, wherein said step c) further comprises a step of changing said scale by a ratio between said first frame distance and said second frame distance.

9. A method of detecting motion vectors within a predetermined search range for a motion compensation predictive coding, said method comprising the steps of:

a) searching for first motion vectors between two frames which are separated from each other in a time dimension by a first frame distance and obtaining said first motion vectors between a backward-reference frame a bidirectionally-predicted frame in order to backwardly predict said bidirectionally-predicted frame;

b) selecting a second frame distance of two frames between which picture motion is represented by second motion vectors and selecting said second frame distance in order to backwardly predict a bidirectionally-predicted frame based on a backward-reference frame; predetermined percentage of said second motion vectors, said check using said first motion vectors as estimates of said second motion vectors after compensation for a difference between said first frame distance and said second frame distance; and d) deciding, based on results of said check, whether to increase a frame distance for prediction and deciding, based on said results of said check, whether to increase said frame distance for forward prediction so that a frame distance for backward prediction is increased from said first frame distance to said second frame distance.

10. The method as claimed in claim 9, wherein said step c) further comprises a step of changing a scale of either said predetermined search range or said first motion vectors in order to achieve said compensation.

11. The method as claimed in claim 10, wherein said step c) further comprises a step of changing said scale by a ratio between said first frame distance and said second frame distance.

12. The method as claimed in claim 2, further comprising the steps of:

e) obtaining a percentage of said first vectors (x, y) satisfying:

$$N \cdot x_{nlb}/(M-n) < x < N \cdot x_{nub}/(M-n)$$

$$N \cdot y_{nlb}/(M-n) < y < N \cdot y_{nub}/(M-n)$$

wherein N is said first frame distance, M is said second frame distance, n is a distance between a forward-reference frame and a bidirectionally-predicted frame which is to be backwardly predicted based on a backward-reference frame distanced from said forward-reference frame by said second frame distance, $x_{nlb}$ and $x_{nub}$ are horizontal boundaries of a search range for backward prediction, and $y_{nlb}$ and $y_{nub}$ are vertical boundaries of said search range for said backward prediction; and f) checking whether said percentage exceeds a predetermined percentage.

13. The method as claimed in claim 2, further comprising the steps of:

e) obtaining third vectors between a backward-reference frame and a bidirectionally-predicted frame which is backwardly predicted based on said backward-reference frame and is distanced from a forward-reference frame by a frame distance n;

f) obtaining a percentage of said third vectors (x, y) satisfying:

$$(N-n) \cdot x_{nlb}/(M-n) < x < (N-n) \cdot x_{nub}/(M-n)$$

$$(N-n) \cdot y_{nlb}/(M-n) < y < (N-n) \cdot y_{nub}/(M-n)$$

wherein N is said first frame distance, M is said second frame distance, $x_{nlb}$ and $x_{nub}$ are horizontal boundaries of a search range for backward prediction, and $y_{nlb}$ and $y_{nub}$ are vertical boundaries of said search range for said backward prediction; and g) checking whether said percentage exceeds a predetermined percentage.

14. The method as claimed in claim 2, further comprising the steps of:

h) obtaining a difference between a forwardly-predicted frame and a corresponding frame which is obtained based on a forward prediction;

i) checking whether said difference exceeds a predetermined amount; and j) shortening said frame distance for said forward prediction when said difference exceeds said predetermined amount.

15. The method as claimed in claim 2, further comprising the steps of:

h) obtaining a difference between a bidirectionally-predicted frame and a corresponding frame which is obtained based on a bidirectional prediction;

i) checking whether said difference exceeds a predetermined amount; and j) shortening said frame distance for said forward prediction when said difference exceeds said predetermined amount.

16. The method as claimed in claim 2, further comprising the steps of:

k) obtaining a difference between said reference frame and said forwardly-predicted frame;

l) checking whether said difference exceeds a predetermined amount; and m) skipping said step c) and maintaining said frame distance for said forward prediction when said difference exceeds said predetermined amount.

17. The method as claimed in claim 2, further comprising the steps of:

n) determining a possible maximum frame distance for said forward prediction; and o) starting said motion-compensation predictive coding by using said possible maximum frame distance for said forward prediction.

18. A device for detecting motion vectors within a predetermined search range for a motion compensation predictive coding, said device comprising:

motion-detection means for searching for first motion vectors between two frames which are separated from each other in a time dimension by a first inter-frame distance;

analysis-and-determination means for selecting a second inter-frame distance in a time dimension of two frames between which picture motion is represented by second motion vectors, and for making a check and receiving a result of whether said predetermined search range covers a predetermined percentage of said second motion vectors, said check using said first motion vectors as estimates of said second motion vectors after compensation for a time difference between said first inter-frame distance and said second inter-frame distance;

control means for controlling, based on the results of said check, a change in an inter-frame distance for detection of said motion vectors for said motion-compensation predictive coding.

19. A device for detecting motion vectors within a predetermined search range for a motion compensation predictive coding, said device comprising:

motion-detection means for searching for first motion vectors between two frames which are separated from each other in a time dimension by a first frame distance and for obtaining said first motion vectors between a reference frame and a forwardly-predicted frame in order to forwardly predict said forwardly-predicted frame;

analysis-and-determination means for selecting a second frame distance of two frames between which picture motion is represented by second motion vectors, and for making a check whether said predetermined search range covers a predetermined percentage of said second motion vectors, said check using said first motion vectors as estimates of said second motion vectors after compensation for a difference between said first frame distance and said second frame distance; and control means for controlling, based on results of said check, a change in a frame distance for prediction and for increasing said frame distance for forward prediction from said first frame distance for forward prediction from said first frame distance to said second frame distance based on said results of said check.

20. A device for detecting motion vectors within a predetermined search range for a motion compensation predictive coding, said device comprising:

motion-detection means for searching for first motion vectors between two frames which are separated from each other in a time dimension by a first frame distance;

analysis-and-determination means for selecting a second frame distance of two frames between which picture motion is represented by second motion vectors, and for making a check whether said predetermined search range covers a predetermined percentage of said second motion vectors, said check using said first motion vectors as estimates of said second motion vectors after compensation for a difference between said first frame distance and said second frame distance and for making a check whether a search range for backward prediction is sufficient after said frame distance for said forward prediction is increased, said check using said first motion vectors as estimates of motion vectors used in said backward prediction.

* * * * *